United States Patent
Hasegawa

(10) Patent No.: US 6,529,879 B1
(45) Date of Patent: Mar. 4, 2003

(54) ELECTRONIC CASH REGISTER ENABLING TO SELECT RECOMMENDATION COMMODITIES TO A CUSTOMER

(75) Inventor: Hiroyasu Hasegawa, Kawasaki (JP)

(73) Assignee: NEC Infrontia Corporation, Kawasaki (JP)

( * ) Notice: Subject to any disclaimer, the term of this patent is extended or adjusted under 35 U.S.C. 154(b) by 0 days.

(21) Appl. No.: 09/419,652

(22) Filed: Oct. 18, 1999

(30) Foreign Application Priority Data

Oct. 19, 1998 (JP) .......................................... 10-296386

(51) Int. Cl.⁷ .............................................. G06F 17/60
(52) U.S. Cl. ....................................................... 705/16
(58) Field of Search ........................................... 705/16

(56) References Cited

U.S. PATENT DOCUMENTS

| | | | | |
|---|---|---|---|---|
| 5,353,219 A | * | 10/1994 | Mueller et al. ................ | 705/16 |
| 5,857,175 A | * | 1/1999 | Day et al. ...................... | 705/14 |
| 5,926,795 A | * | 7/1999 | Williams et al. ............... | 705/14 |
| 6,119,099 A | * | 9/2000 | Walker et al. ................. | 705/16 |
| 6,223,163 B1 | * | 4/2001 | Van Luchene ............... | 705/16 |
| 6,282,516 B1 | * | 7/2001 | Giuliani ........................ | 705/16 |
| 6,327,573 B1 | * | 12/2001 | Walker et al. ................. | 705/14 |
| 6,412,012 B1 | * | 6/2002 | Bieganski et al. ........... | 709/232 |

FOREIGN PATENT DOCUMENTS

WO          WO 98/38589        *   9/1998   ........... G06F/17/60

OTHER PUBLICATIONS

Wallace, Bob, "Data Quality Moves to the Forefront", Sep. 20, 1999, Information Week, 52.*
Manes, Stephen, "The Road to Respect", Mar. 1989, PC–Computing, vol. 2, No. 3, pp. 107–113.*

* cited by examiner

Primary Examiner—Robert P. Olszewski
Assistant Examiner—Bryan Jaketic
(74) Attorney, Agent, or Firm—Michael Best & Friedrich LLC

(57) ABSTRACT

An electronic cash register for registering sales of commodities sold to a customer is stored with a list of predetermined commodities to be recommended to customers. The predetermined commodities are compared one after another according to priority orders with the commodities sold and extracts items in the predetermined commodities which are different from the commodities sold. Then, the extracted items are displayed on a monitor display, and are recommended to the customer.

9 Claims, 3 Drawing Sheets

Cheese Burger   1.50

FIG. 3

Cheese Burger   1.50
Double Burger   1.50

FIG. 4

ELECTRONIC CASH REGISTER ENABLING TO SELECT RECOMMENDATION COMMODITIES TO A CUSTOMER

BACKGROUND OF THE INVENTION

This invention relates to an electronic cash register.

The electronic cash register is usually used in a shop, restaurant, department store or other stores for registering sales of commodities or goods sold to a customer.

A conventional one of the electronic cash register comprises a computer system comprising a storage such as a random access memory (RAM) and a read only memory (ROM), an input unit such as a keyboard and/or a bar-code reader, a processing unit, and a monitor display.

When selling commodities to a customer or accepting order of commodities from a customer, an operator operates the keyboard or the bar-code reader to input data (name and number) of commodities sold or ordered.

In the present description and claims accompanied thereto, the terms "commodities sold", "commodities ordered", "sold commodities" and "ordered commodities" should be understood to have same meanings. The terms refer to the commodities which the customer buys and receives by paying money.

The processing unit calculates a total price value of the commodities sold using price data stored in the storage and stores, as sales data, the data of commodities sold and the total price value in the storage. The input data of the commodities sold, a price of each item of the commodities sold, and the total price values are displayed on the monitor display. Thus, the customer and the operator can inspect of them.

The sales data stored in the storage can be used for management of the sales and inventory.

In some stores, it is sometimes performed to recommend specific commodities to customers so as to decrease stock of the specific commodities and/or increase their sales. Thus, the operator recommends a particular customer to buy the specific commodities, while handling the electronic cash register to input data of the commodities ordered by the particular. However, it is difficult to remember a list of predetermined commodities to be recommended to customers and to recommend the commodities to be recommended without erroneously recommending commodities which the particular customer has just ordered.

SUMMARY OF THE INVENTION

Therefore, it is an object of this invention to provide a method for selecting, by use of an electronic cash register, recommendation commodities from a list of predetermined commodities to be recommended to customers when handling the electronic cash register to register commodities bought by a particular customer into the electronic cash register.

It is another object of this invention to provide an electronic cash register which can perform the method described above.

According to this invention, there is provided a method for selecting recommendation commodities to a customer by use of an electronic cash register which is operated when selling commodities to the customer to register sales of the commodities sold. The method comprises:

previously storing into the electronic cash register a list of predetermined commodities to be recommended;

when registering the sales of commodities sold to the customer, making the electronic cash register perform operations of:

(1) comparing the commodities sold with the list of the predetermined commodities to select, as a selected item, one of the predetermined commodities which is different from the commodities sold; and (2) indicating the selected item;

then recommending, as recommendation commodities, the selected item to the customer.

In a preferred embodiment, the list may contains different priority orders which are previously assigned to the predetermined commodities, respectively. Thus, in operation (1), the predetermined commodities are compared one after another according to the priority orders with the commodities sold. That one of the predetermined commodities which is firstly found out different from the commodities sold is selected as a first selected one. And, in operation (2), the first selected one is indicated as the selected item.

The method may further comprise making the electronic cash register perform operations of: (3) continuing the operation (1) after indication of the selected item, to select, as a subsequently selected one, another of the predetermined commodities which is subsequently found out different from the commodities sold; and (4) indicating the subsequently selected one as the selected item.

Operations (3) and (4) are repeated by a predetermined number of times to recommend a number of recommendation commodities to the customer.

According to this invention, an electronic cash register which can perform the above mentioned method is also provided, which comprises:

a storage for storing a list of predetermined commodities to be recommended to customers;

an inputting device for inputting ordered commodities when selling the ordered commodities to a particular customer;

an extracting device for extracting, as recommendation commodities, that items in the predetermined commodities in the list which are different from the ordered commodities; and a displaying device for displaying the recommendation commodities.

In an aspect of this invention, the list contains recommendation priority orders of the predetermined commodities. The extracting device compares the predetermined commodities one after another according to the priority orders with the ordered commodities to sequentially select items, as the recommendation commodities of the predetermined commodities which are different from the ordered commodities.

The storage further stores a predetermined number which prescribes the maximum number of commodities. Thus, the extracting device extracts the predetermined number of recommendation commodities.

BRIEF DESCRIPTION OF THE DRAWINGS

FIG. 3 shows an example indicated on a display; and

FIG. 4 shows another example indicated on the display.

DESCRIPTION OF THE PREFERRED EMBODIMENTS

Figure 1:
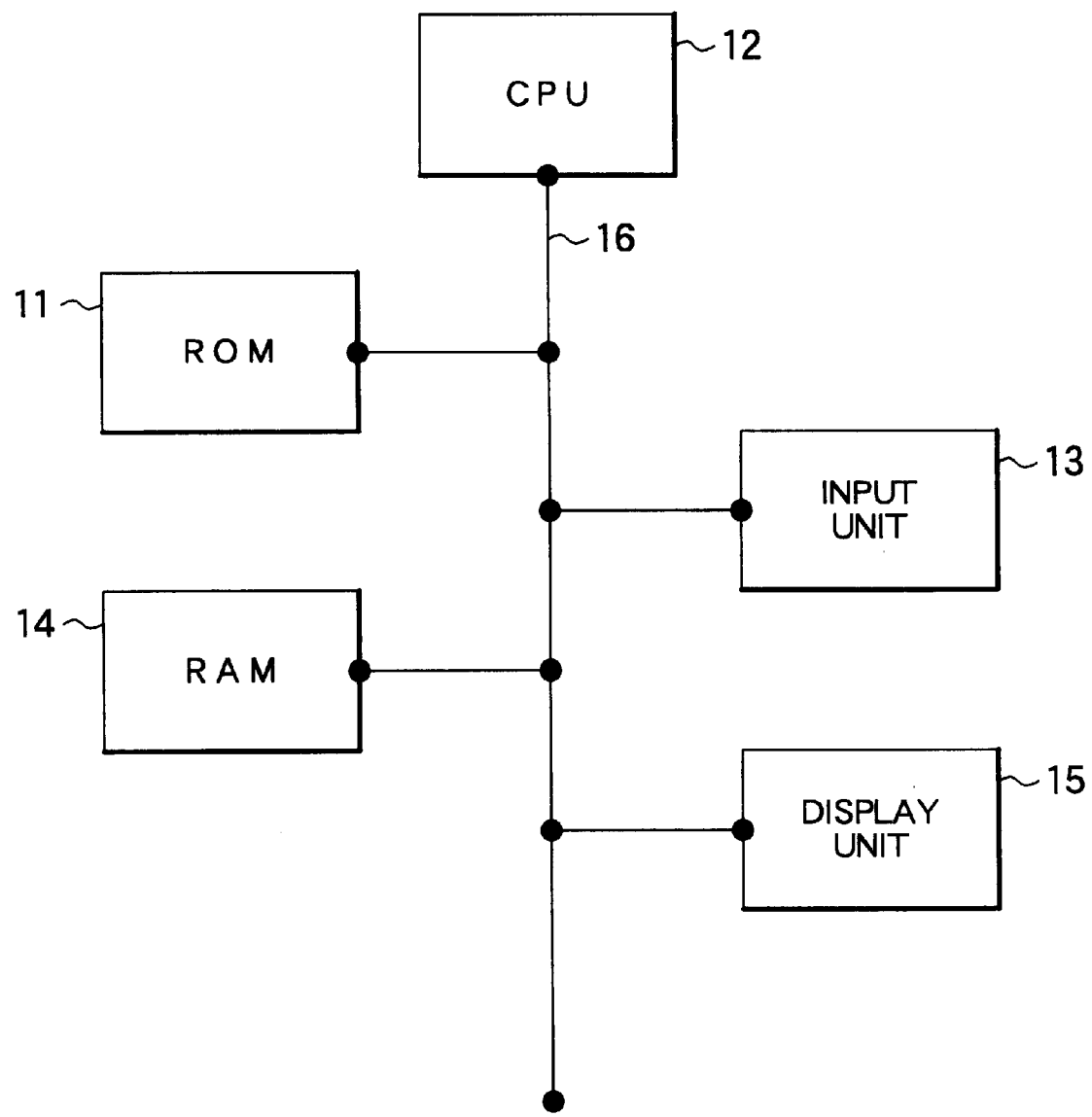
FIG. 1 is a block diagram of an electronic cash register according to an embodiment of this invention.

Referring to FIG. 1, there is shown an electronic cash register which comprises a computer system comprising a ROM 11, a central processing unit (CPU) 12, an input unit 13 such as a keyboard, a mouse, and/or a bar-code reader, a ROM 14, and a monitor display 15 such as a cathode ray tube (CRT) or a liquid crystal display (LCD), all of which are connected through a main bus 16.

Generally speaking, ROM 11 stores an operating system (OS) and a cash register program. RAM 14 has a price list of various commodities previously stored and stores sales data. CPU 12 reads out and executes the OS and the cash register program, while instruction or order and data are inputted through the input unit 13 by an operator or a clerk, thus registering sales of commodities sold.

When selling commodities to a particular customer or accepting order of commodities from a customer, an operator operates the keyboard or the bar-code reader to input data (name and number) of commodities sold. According to the cash register program, CPU 12 calculates a total price value of the commodities sold using the price list stored in RAM 14 and stores, as sales data, the data commodities sold and the total price value together with the date and time into RAM 14. The input data of the commodities sold, a price of each item of the commodities sold, and the total price values are displayed on the monitor display 15. Thus, the customer and the operator can inspect of them. The process will be referred to as "sales process". Finally, the operator pushes an end key for completing the "sales process" to register the current sales to the particular customer into the electronic cash register.

According to the present invention, a recommendation commodities selection program is previously stored in ROM 11. Alternatively, it may be stored in RAM 12.

Before opening the store, the operator writes into RAM 14 a list of commodities predetermined to be recommended to customers in that day, if necessary, together with recommendation priority orders and a number which indicates the maximum number N of commodities to be recommended to a customer.

An example of the list of predetermined commodities to be recommended is shown in the following Table 1.

TABLE 1

| Priority Order | Number | Commodities |
| --- | --- | --- |
| 1 | 00001 | Chicken Burger |
| 2 | 00002 | Cheese Burger |
| 3 | 00003 | Double Burger |

Figure 2:
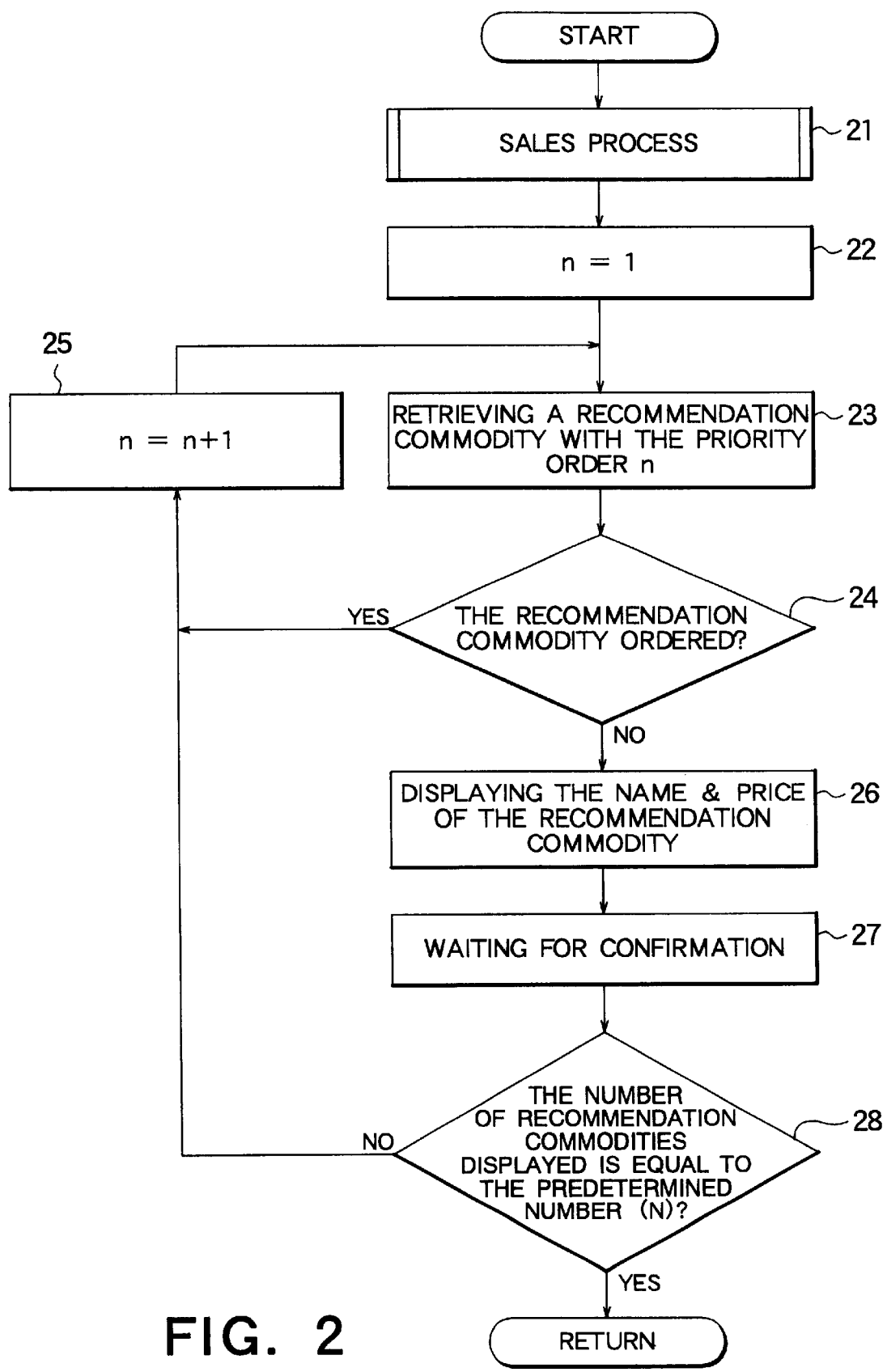
FIG. 2 is a flow chart illustrating operation of the electronic cash register of FIG. 1 for selecting recommendation commodities.

Now, referring to FIG. 2, sales registering and recommendation commodities selection operation will be described, below.

In the sales process at step 21, it is provided that the commodities shown in Table 2 were sold to or ordered by a particular customer and input through the input unit 13.

TABLE 2

| Commodities | Number of Items |
| --- | --- |
| Apple pie | 1 |
| Chicken Burger | 1 |
| Orange Juice | 1 |

When the operator pushes the end key, the CPU 12 performs the following operation according to the recommendation commodities selection program.

At first, the commodities with the priority order of n=1, that is, Chicken Burger is read out or retrieved from the list (Table 1) in RAM 14, as shown at steps 22 and 23. The commodities or Chicken Burger is compared with the commodities sold in Table 2 at step 24. Chicken Burger is already ordered by the customer as shown in Table 2, the priority order is changed to n=2 at step 25.

Then, the commodities with the priority order of n=2, that is, Cheese Burger is read out or retrieved from the list in RAM 14 at step 23 and is compared with the commodities sold in Table 2 at step 24. Since Cheese Burger is not ordered by the customer as shown in Table 2, Cheese Burger is selected as a selected item and is displayed as a recommendation commodities together with its price on the monitor display 15 at step 26. The display is shown in FIG. 3.

According to the display, the operator can recommend the Cheese Burger to the customer without failure. When the customer orders the recommendation commodities or Cheese Burger, the operator operates the input unit to add Cheese Burger in Table 2 of the commodities sold. On the other hand, when the customer rejects Cheese Burger, the operator pushes the end key or any other key as predetermined. Thus, a confirmation signal is input at step 27.

Then, CPU 12 compares, at step 28, the number of items displayed as recommendation commodities on the monitor display 15 with the maximum value or predetermined value N previously set. When both are equal to each other, for example N=1, CPU 12 completes to register the sales of commodities sold shown in Table 2 together with or without addition of Cheese Burger.

When the both are not equal to each other, for example N=2, CPU 12 sets the next priority order, that is n=3, at step 25. Thus, Double Burger is read out from the list in Table 1 and is compared with the commodities sold in Table 2 at steps 23 and 24. Since Double Burger is not contained in the commodities sold in Table 2, it is displayed on the monitor display 15 as shown in FIG. 4. Thereafter, operations described above are repeated along steps 27 and 28.

As described above, the electronic cash register according to this invention has the recommendation commodities selection program. According to the program, a list of predetermined commodities to be recommended to customers is written in a storage or RAM. When selling the ordered commodities to a particular customer, the ordered commodities are input through the input unit. Then, CPU extracts, as recommendation commodities, that items in the predetermined commodities in the list which are different from the ordered commodities, and then displays the recommendation commodities on the monitor display. Thus, the operator or the clerk can correctly recommend the recommendation commodities to the customer without failure.

The recommendation commodities selection program can be set in the electronic cash register during production processes thereof. Alternatively, it can be installed in the electronic cash register from a floppy disk or other recording medium having the program by a user himself.

What is claimed is:

1. A method for selecting a recommendation of commodities to a customer by use of an electric cash register which is operated when selling commodities to the customer in order to register sales of ordered commodities being sold to the customer, said method comprising the steps of:
   periodically storing into the electric cash register a list of selected ones of predetermined commodities to be recommended, said list containing different priority orders which are previously assigned to the predetermined commodities, respectively;
   when registering sales of the ordered commodities being sold to the customer, making the electronic cash register perform the steps of:

(1) comparing the ordered commodities with said list of predetermined commodities to select, as a selected Item, independently of an amount of change due, one of said predetermined commodities which is different from said commodities sold;

said predetermined commodities being compared one after another according to the priority orders with the ordered commodities, one of said predetermined commodities which is first found to be different from the ordered commodities being selected as a first selected one; and (2) indicating said selected item, said first selected item being displayed as said selected item, then recommending, as recommendation commodities, said selected items to the customer.

2. A method as claimed in claim 1, further comprising:

making the electronic cash register perform further operations of;

(3) continuing said operation (1) after indication of said selected item, to select, as a subsequently selected one, another of said predetermined commodities which is subsequently found to be different from the commodities sold; and (4) indicating said subsequently selected one as said selected item.

3. A method as claimed in claim 2, wherein operations (3) and (4) are repeated a predetermined number of times in order to recommend a number of recommendation of commodities to the customer.

4. A recording medium storing a recommendation of a commodities selection program executed by a computer in an electronic cash register, said computer comprising an input unit, a storage unit, a display unit and a processing unit, said recommendation of commodities selection program consisting of the steps of:

(1) periodically storing into said storage unit a list of selected ones of predetermined commodities to be recommended to customers, said list containing different priority orders which are previously assigned to the predetermined commodities, respectively;

(2) accepting ordered commodities, said ordered commodities being inputted through said input unit when selling the ordered commodities to a customer;

(3) comparing, by said processing unit, said predetermined commodities in said list with said ordered commodities to select, as a selected item, independently of an amount of change due, one of said predetermined commodities which is different from said ordered commodities, said predetermined commodities being compared one after another according to the priority orders with the ordered commodities, one of said predetermined commodities which is first found to be different from the ordered commodities being selected as a first selected one; and (4) displaying said selected item on said display unit.

5. A recording medium as claimed in claim 4, wherein said recommendation of commodities selection program further comprising processes of:

(5) continuing said process (3) after displaying said selected item in process (4), to select, as a subsequently selected one, another of said predetermined commodities which is subsequently found to be different from the ordered commodities; and (6) displaying said subsequently selected one as said selected item.

6. A recording medium as claimed in claim 4, wherein said recommendation of commodities selection program further comprising processes of:

registering a predetermined number of repeating times; and repeating processes (5) and (6) the predetermined number of times.

7. An electronic cash register, comprising:

a storage device for periodically storing a list of selected ones of predetermined commodities to be recommended to customers, said list containing different priority orders which are previously assigned to the predetermined commodities, respectively;

an input device for imputing ordered commodities when selling the ordered commodities to a particular customer, said predetermined commodities being compared one after another according to the priority orders with the ordered commodities, that one of said predetermined commodities which is first found to be different from the ordered commodities being selected as a first selected one;

an extracting device for extracting, as a recommendation of commodities, independently of an amount of change due, those items in the predetermined commodities in said list which are different from said ordered commodities; and a display device for displaying said recommendation of commodities, said first selected commodity being displayed as a said selected item;

continuing said process after displaying said selected item, to select, as a subsequently selected one, another of said predetermined commodities which is subsequently found to be different from the ordered commodities; and displaying said subsequently selected commodity as said selected item.

8. An electronic cash register as claimed in claim 7, wherein:

said list contains recommendation priority orders of the predetermined commodities; and said extracting device comparing said predetermined commodities one after another according to the priority orders with said ordered commodities to sequentially select items, as said recommendation commodities of the predetermined commodities which are different from said ordered commodities.

9. An electronic cash register as claimed in claim 7, wherein:

the storage device further stores a predetermined number which prescribes the maximum number of commodities; and the extracting device extracts commodities to the maximum of the predetermined number of commodities.

* * * * *